(12) United States Patent
Tokumoto

(10) Patent No.: US 11,656,810 B2
(45) Date of Patent: May 23, 2023

(54) PRINTING SYSTEM, PRINTING APPARATUS, CONTROL METHODS THEREFOR, AND STORAGE MEDIUM

(71) Applicant: CANON KABUSHIKI KAISHA, Tokyo (JP)

(72) Inventor: Hirokazu Tokumoto, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/551,294

(22) Filed: Dec. 15, 2021

(65) Prior Publication Data
US 2022/0197573 A1 Jun. 23, 2022

(30) Foreign Application Priority Data
Dec. 22, 2020 (JP) .............................. JP2020-212707

(51) Int. Cl.
G06F 3/12 (2006.01)
(52) U.S. Cl.
CPC .......... G06F 3/1208 (2013.01); G06F 3/1238 (2013.01); G06F 3/1253 (2013.01);
(Continued)
(58) Field of Classification Search
CPC .... G06F 3/1208; G06F 3/1238; G06F 3/1253; G06F 3/1267; G06F 3/1288;
(Continued)

(56) References Cited

U.S. PATENT DOCUMENTS

| | | | | |
|---|---|---|---|---|
| 8,446,629 | B2 * | 5/2013 | Ishibashi | G06F 3/1243 399/385 |
| 2004/0190057 | A1 * | 9/2004 | Takahashi | G06F 3/1205 358/1.15 |

FOREIGN PATENT DOCUMENTS

| | | |
|---|---|---|
| JP | 2007251279 A | 9/2007 |
| JP | 2010211627 A | 9/2010 |

* cited by examiner

*Primary Examiner* — Darryl V Dottin
(74) *Attorney, Agent, or Firm* — Rossi, Kimms & McDowell LLP

(57) ABSTRACT

A printing system that is capable of performing a printing of a print job, in which a change of a setting of a sheet feeding stage is correctly reflected in the remote printing is provided. The printing system includes a printing apparatus and a storage apparatus. The printing apparatus includes a sheet feeding cassette configured to include a plurality of sheet feeding stages, one or more first memories and one or more first processors that execute a set of first instructions to accept specifying of a sheet feeding stage, which is used when the printing apparatus executes a print job stored in the storage apparatus, from a user, obtain a first setting value of the specified sheet feeding stage, transmit identification information, which indicates the print job, and the obtained first setting value of the sheet feeding stage to the storage apparatus, receive the print job, which includes the first setting value of the sheet feeding stage, from the storage apparatus, and execute the received print job according to the first setting value of the sheet feeding stage. The storage apparatus includes one or more second memories, and one or more second processors that execute a set of second instructions to receive a print job, which includes a second setting value of a sheet feeding stage, from an external apparatus, store the received print job, receive the identification information, which indicates the print job, and the first setting value of the sheet feeding stage from the printing apparatus, change a second setting value of a sheet feeding stage included in the print job indicated by the identification information to the received first setting value of the sheet feeding stage, and transmit the print job, which includes the first setting value of the sheet feeding stage, to the printing apparatus.

9 Claims, 17 Drawing Sheets

(52) U.S. Cl.
CPC .......... *G06F 3/1267* (2013.01); *G06F 3/1288*
(2013.01); *G06F 3/1204* (2013.01)
(58) Field of Classification Search
CPC .... G06F 3/1204; G06F 3/1205; G06F 3/1237;
G06F 3/1285; B41J 3/44; B41J 29/393
USPC ....................................................... 358/1.13
See application file for complete search history.

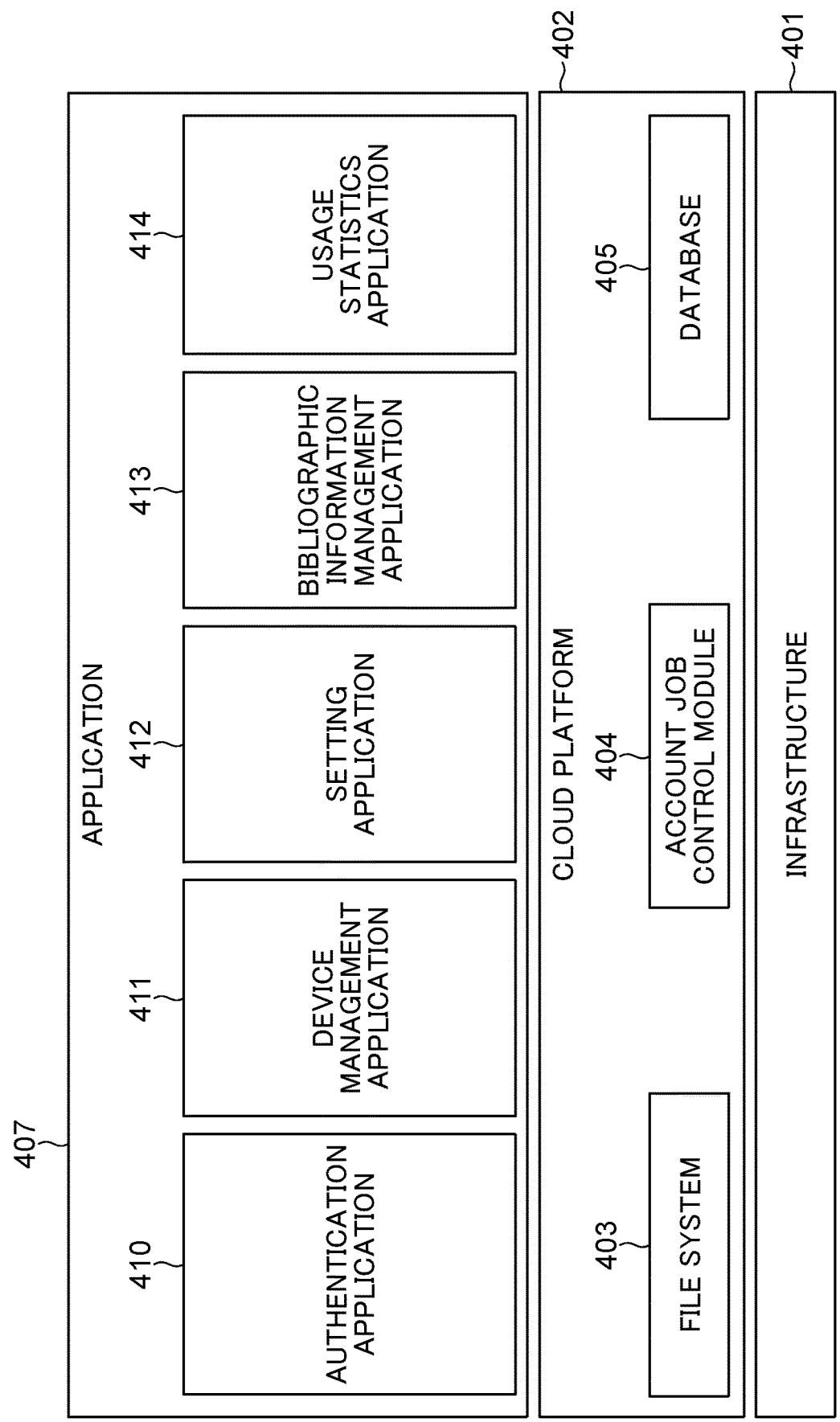

FIG. 6B

| DISPLAY NAME | SETTING VALUE |
|---|---|
| AUTOMATIC FEEDING | 0 |
| MANUAL FEEDING | 10 |
| CASSETTE 1 | 21 |
| CASSETTE 2 | 22 |
| CASSETTE 3 | 11 |
| CASSETTE 4 | 12 |

| DISPLAY NAME | SETTING VALUE |
|---|---|
| AUTOMATIC FEEDING | 0 |
| MANUAL FEEDING | 10 |
| CASSETTE 1 | 11 |
| CASSETTE 2 | 51 |

612

PRINTING SYSTEM, PRINTING APPARATUS, CONTROL METHODS THEREFOR, AND STORAGE MEDIUM

BACKGROUND OF THE INVENTION

Field of the Invention

The present disclosure relates to a printing system, a printing apparatus, control methods therefor, and a storage medium.

Description of the Related Art

An image forming apparatus (a printing apparatus) performing hold printing is known. In the hold printing, when the image forming apparatus receives a print job from an external apparatus such as a PC (personal computer), the image forming apparatus temporarily retains the received print job in a storage area of the image forming apparatus without immediately executing printing of the said print job. After that, when a user operates an operating unit of the image forming apparatus to issue an execution instruction of the printing of the above print job, the image forming apparatus starts the printing of the retained print job (for example, see Japanese Laid-Open Patent Publication (kokai) No. 2007-251279). By performing the hold printing, it is possible to prevent the occurrence of information leakage due to forgetting to take a printed matter or viewing the neglected printed matter by a third party.

Further, the image forming apparatus communicates with another image forming apparatus, and performs remote printing of a print job, which is retained in a storage area of the another image forming apparatus. In the remote printing, the image forming apparatus obtains a print job, which is selected from a plurality of print jobs retained in the storage area of the another image forming apparatus by the user operating the operating unit of the image forming apparatus, from the another image forming apparatus, and performs the printing of the obtained print job (for example, see Japanese Laid-Open Patent Publication (kokai) No. 2010-211627). When the user issues an execution instruction of the remote printing, the user can issue a change instruction of a print setting of the print job retained in the storage area of the another image forming apparatus. For example, the user operates the operating unit of the image forming apparatus to issue an instruction to change a sheet feeding stage, which is set in the above print job, to a sheet feeding stage of the image forming apparatus, in which printing sheets of the size and type desired by the user are accommodated. According to this instruction, the another image forming apparatus changes the sheet feeding stage, which is set in the above print job, to the sheet feeding stage specified by the user, and then transmits the changed print job to the image forming apparatus.

However, in the conventional remote printing, when the user issues a change instruction of a setting of the sheet feeding stage of the print job retained in the storage area of the another image forming apparatus from the operating unit of the image forming apparatus, the change of the setting may not be reflected correctly. Here, in the case of changing the setting of the sheet feeding stage of the print job, it is necessary to change a setting value, which indicates the sheet feeding stage set in the print job, to a control setting value, which is used in the control of the sheet feeding stage specified by the user. This control setting value is a setting value assigned to each sheet feeding stage within the image forming apparatus, and the another image forming apparatus does not retain the same control setting value. On the other hand, when the user issued the change instruction of the setting of the sheet feeding stage of the print job retained in the storage area of the another image forming apparatus from the operating unit of the image forming apparatus, as described above, the another image forming apparatus changes the setting of the sheet feeding stage of the print job. Since the another image forming apparatus does not retain the control setting value, which is used in the control of the sheet feeding stage specified by the user, the change of the setting intended by the user cannot be reflected in the print job. That is, conventionally, in the remote printing, it is not possible to perform the printing of the print job, in which the change of the setting of the sheet feeding stage is correctly reflected.

SUMMARY OF THE INVENTION

Various embodiments of the present disclosure provide a printing system and a printing apparatus that are capable of performing a printing of a print job, in which a change of a setting of a sheet feeding stage is correctly reflected in the remote printing, control methods therefor, and a storage medium.

According to one embodiment, a printing system is provided that includes a printing apparatus and a storage apparatus. The printing apparatus comprises a sheet feeding cassette configured to include a plurality of sheet feeding stages, one or more first memories, and one or more first processors that execute a set of first instructions to accept specifying of a sheet feeding stage, which is used when the printing apparatus executes a print job stored in the storage apparatus, from a user, obtain a first setting value of the specified sheet feeding stage, transmit identification information, which indicates the print job, and the obtained first setting value of the sheet feeding stage to the storage apparatus, receive the print job, which includes the first setting value of the sheet feeding stage, from the storage apparatus and execute the received print job according to the first setting value of the sheet feeding stage. The storage apparatus comprises one or more second memories, and one or more second processors that execute a set of second instructions to receive a print job, which includes a second setting value of a sheet feeding stage, from an external apparatus, store the received print job, receive the identification information, which indicates the print job, and the first setting value of the sheet feeding stage from the printing apparatus, change a second setting value of a sheet feeding stage included in the print job indicated by the identification information to the received first setting value of the sheet feeding stage, and transmit the print job, which includes the first setting value of the sheet feeding stage, to the printing apparatus.

According to the present disclosure, it is possible to perform the printing of the print job, in which the change of the setting of the sheet feeding stage is correctly reflected in the remote printing.

Further features of the present disclosure will become apparent from the following description of exemplary embodiments with reference to the attached drawings.

BRIEF DESCRIPTION OF THE DRAWINGS

FIG. 4 is a block diagram that schematically shows a software configuration of a cloud server of FIG. 1.

DESCRIPTION OF THE EMBODIMENTS

Various embodiments of the present disclosure will now be described in detail below with reference to the accompanying drawings showing embodiments thereof.

Hereinafter, in the embodiment of the present disclosure, although the case that the present disclosure is applied to a multifunction peripheral as a printing apparatus will be described, the present disclosure is not limited to being applied to the multifunction peripheral having a plurality of functions, and the present disclosure may be applied to a printer having only a print function.

Figure 1:
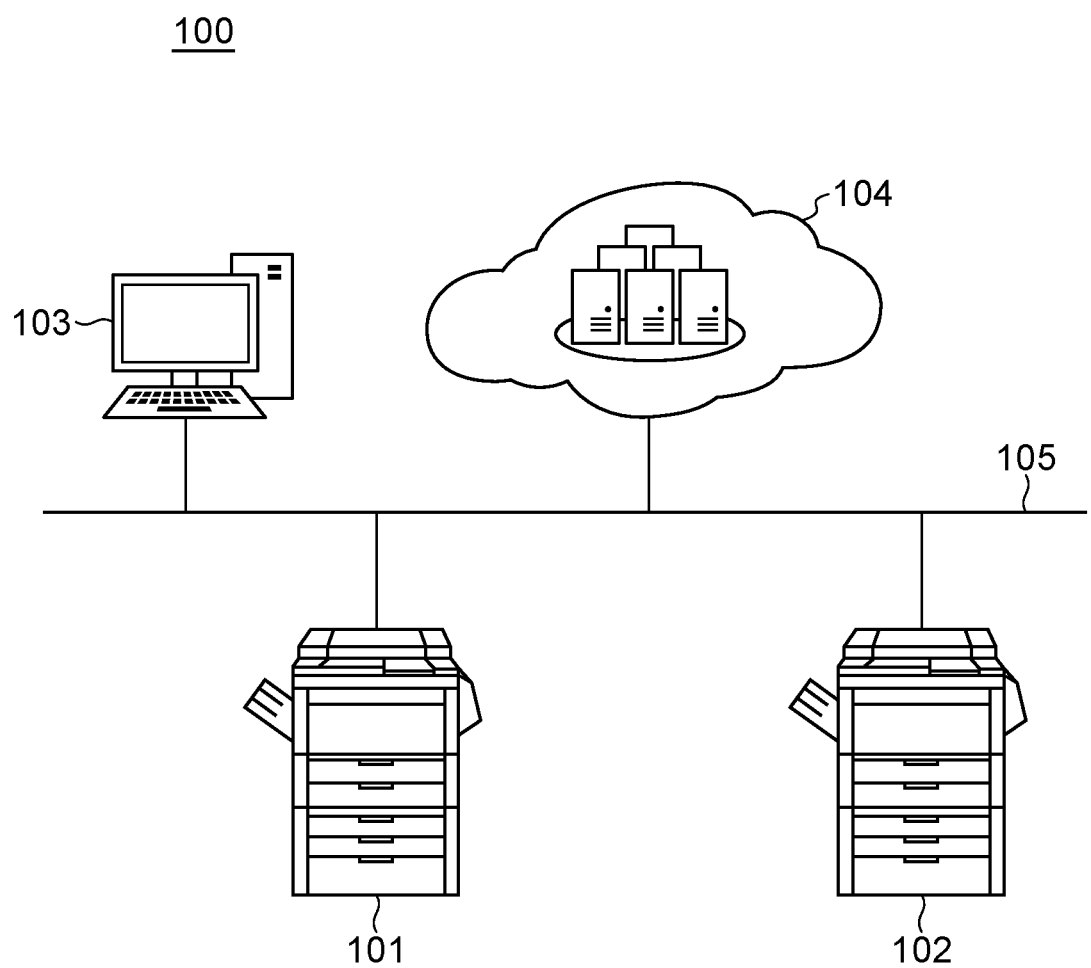
FIG. 1 is a network diagram that schematically shows a configuration of a printing system including a multifunction peripheral 101 and a multifunction peripheral 102 as printing apparatuses according to one embodiment of the present disclosure.

FIG. 1 is a network diagram that schematically shows a configuration of a printing system 100 including a multifunction peripheral 101 and a multifunction peripheral 102 as printing apparatuses according to one embodiment of the present disclosure. As shown in FIG. 1, the printing system 100 has the multifunction peripheral 101, the multifunction peripheral 102, a PC 103, and a cloud server 104. The multifunction peripheral 101, the multifunction peripheral 102, the PC 103, and the cloud server 104 are connected to each other via a network 105 that supports the TCP/IP (Transmission Control Protocol/Internet Protocol) protocol. Moreover, in the present embodiment, as one example, although the configuration, in which the printing system 100 includes two multifunction peripherals will be described, the printing system 100 may be configured to include three or more multifunction peripherals.

On the basis of print jobs received from the PC 103, the multifunction peripheral 101 and the multifunction peripheral 102 generate bibliographic information of the said print jobs, and transmit the generated bibliographic information to the cloud server 104. The bibliographic information is management information of the print job, which is submitted into the multifunction peripheral. The bibliographic information includes a job ID and a reception date and time of the print job, an IP address and a directory path of the multifunction peripheral that stores the print job, a job name and a print setting of the print job, etc. The cloud server 104 manages all the multifunction peripherals that are registered on the network 105, and centrally manages the bibliographic information of all the print jobs that are stored in these multifunction peripherals. Moreover, although it is also possible for the multifunction peripheral 101 and the multifunction peripheral 102 to manage the bibliographic information, in the present embodiment, the cloud server 104 manages the bibliographic information. In a configuration that the cloud server 104 manages the bibliographic information, unlike the multifunction peripherals that need to distribute resources to other functions such as a copy function and a scan function in addition to a bibliographic information management function, the cloud server 104 can concentrate resources on the bibliographic information management function. Therefore, even in the case that accesses to the cloud server 104 are concentrated, the cloud server 104 can ensure sufficient resources for realizing the bibliographic information management function, and as a result it is possible to maintain a response performance. Further, in the configuration that the cloud server 104 manages the bibliographic information, unlike the multifunction peripherals that store the bibliographic information in a built-in storage device having a limited storage capacity, the cloud server 104 can easily expand the storage capacity for storing the bibliographic information. Furthermore, in the configuration that the cloud server 104 manages the bibliographic information, unlike the multifunction peripherals, in which the use of the bibliographic information management function is possible only when a power of the multifunction peripheral is turned on, since there is no limitation that the use of the bibliographic information management function is possible only when the power of the multifunction peripheral is turned, it is possible to reduce downtime of the bibliographic information management function.

The multifunction peripheral 101 and the multifunction peripheral 102 perform remote printing. In the remote printing, for example, the multifunction peripheral 102 performs user authentication based on authentication information that is inputted by a user, and when the user authentication is successful, the multifunction peripheral 102 obtains bibliographic information corresponding to the authentication information from the cloud server 104. Further, the multifunction peripheral 102 receives a print job corresponding to the obtained bibliographic information from an apparatus that stores the print job, for example, the multifunction peripheral 101, and then performs printing of the received print job. In the remote printing, hereinafter a multifunction peripheral that transmits a print job is referred to as "a document reception device (i.e., an input device)", and a multifunction peripheral that performs the printing of the received print job is referred to as "an output device". In the present embodiment, both the multifunction peripheral 101 and the multifunction peripheral 102 work as not only the document reception device but also the output device. That is, in the present embodiment, all the multifunction peripherals registered on the same network 105 work as not only the document reception device but also the output device.

Figure 2A:
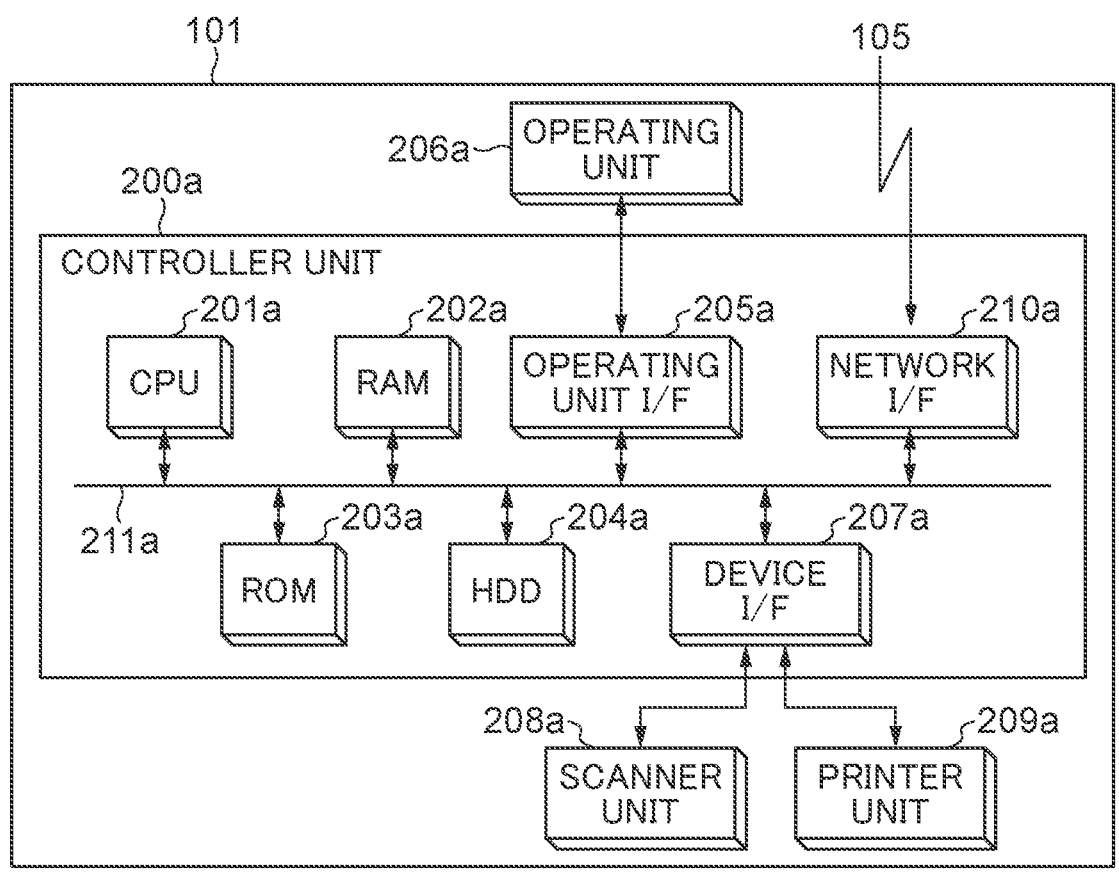
FIG. 2A is a block diagram that schematically shows a hardware configuration of the multifunction peripheral 101 of FIG. 1.
Figure 2B:
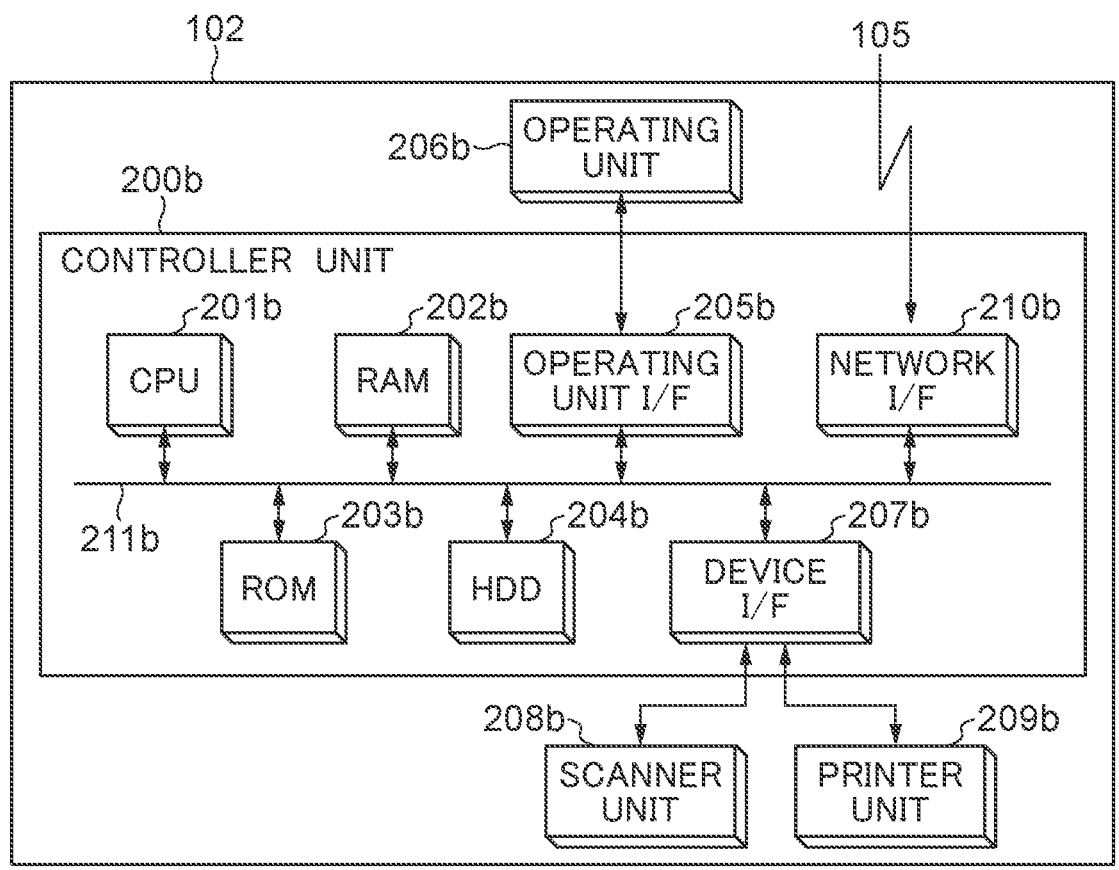
FIG. 2B is a block diagram that schematically shows a hardware configuration of the multifunction peripheral 102 of FIG. 1.

FIGS. 2A and 2B are block diagrams that schematically show hardware configurations of the multifunction peripheral 101 and the multifunction peripheral 102 of FIG. 1. FIG. 2A schematically shows the hardware configuration of the multifunction peripheral 101. As shown in FIG. 2A, the multifunction peripheral 101 has a controller unit 200a, an operating unit 206a, a scanner unit 208a, and a printer unit 209a. The controller unit 200a is connected to the operating unit 206a, the scanner unit 208a, and the printer unit 209a.

The controller unit 200a controls an entire multifunction peripheral 101. The controller unit 200a has a CPU (Central Processing Unit) 201a, a RAM (Random Access Memory) 202a, a ROM (Read Only Memory) 203a, an HDD (Hard Disk Drive) 204a, an operating unit I/F (Interface) 205a, a device I/F 207a, and a network I/F 210a. The CPU 201a, the RAM 202a, the ROM 203a, the HDD 204a, the operating unit I/F 205a, the device I/F 207a, and the network I/F 210a are connected to each other via a system bus 211a.

The CPU 201a comprehensively controls each unit connected via the system bus 211a. The RAM 202a stores programs such as an operating system, system software and application software, and various kinds of data. The ROM 203a stores boot programs of the system, system programs, and application programs. Further, the ROM 203a stores information necessary for the multifunction peripheral 101 such as fonts. The HDD 204a stores the operating system, the system software, the application software, image data, setting data, the print jobs, etc. Moreover, in the present embodiment, the multifunction peripheral 101 may be configured to store the operating system, the system software, the application software, the image data, the setting data, the print jobs, etc. in the ROM 203a without being equipped with the HDD 204a. Further, the multifunction peripheral 101 may be configured to include a storage device such as an SSD (Solid State Disk) instead of the HDD 204a.

The operating unit I/F 205a is an interface unit with the operating unit 206a that has a touch panel, and outputs image data, which will be displayed on the operating unit 206a, to the operating unit 206a. Further, the operating unit I/F 205a obtains information, which is inputted into the operating unit 206a by the user, from the operating unit 206a, and then outputs the obtained information to the CPU 201a.

The device I/F 207a is an interface unit for connecting the scanner unit 208a and the printer unit 209a to the controller unit 200a, and performs input and output of the image data. The image data, which is outputted from the scanner unit 208a, is stored in the RAM 202a or the HDD 204a via the device I/F 207a. An image processing is performed with respect to the stored image data by the application program stored in the RAM 202a as needed. Further, the image data is outputted to the printer unit 209a via the device I/F 207a. The network I/F 210a performs transmission and reception of data with the multifunction peripheral 102, the PC 103, the cloud server 104, etc. that are connected to the network 105.

FIG. 2B schematically shows the hardware configuration of the multifunction peripheral 102. As shown in FIG. 2B, the multifunction peripheral 102 has a controller unit 200b, an operating unit 206b, a scanner unit 208b, and a printer unit 209b. The controller unit 200b is connected to the operating unit 206b, the scanner unit 208b, and the printer unit 209b.

The controller unit 200b controls an entire multifunction peripheral 102. The controller unit 200b has a CPU 201b, a RAM 202b, a ROM 203b, an HDD 204b, an operating unit I/F 205b, a device I/F 207b, and a network I/F 210b. The CPU 201b, the RAM 202b, the ROM 203b, the HDD 204b, the operating unit I/F 205b, the device I/F 207b, and the network I/F 210b are connected to each other via a system bus 211b.

The CPU 201b comprehensively controls each unit connected via the system bus 211b. The RAM 202b stores programs such as an operating system, system software and application software, and various kinds of data. The ROM 203b stores boot programs of the system, system programs, and application programs. Further, the ROM 203b stores information necessary for the multifunction peripheral 102 such as fonts. The HDD 204b stores the operating system, the system software, the application software, image data, setting data, the print jobs, etc. Moreover, in the present embodiment, the multifunction peripheral 102 may be configured to store the operating system, the system software, the application software, the image data, the setting data, the print jobs, etc. in the ROM 203b without being equipped with the HDD 204b. Further, the multifunction peripheral 102 may be configured to include a storage device such as an SSD instead of the HDD 204b.

The operating unit I/F 205b is an interface unit with the operating unit 206b that has a touch panel, and outputs image data, which will be displayed on the operating unit 206b, to the operating unit 206b. Further, the operating unit I/F 205b obtains information, which is inputted into the operating unit 206b by the user, from the operating unit 206b, and then outputs the obtained information to the CPU 201b.

The device I/F 207b is an interface unit for connecting the scanner unit 208b and the printer unit 209b to the controller unit 200b, and performs input and output of the image data. The image data, which is outputted from the scanner unit 208b, is stored in the RAM 202b or the HDD 204b via the device I/F 207b. An image processing is performed with respect to the stored image data by the application program stored in the RAM 202b as needed. Further, the image data is outputted to the printer unit 209b via the device I/F 207b. The network I/F 210b performs transmission and reception of data with the multifunction peripheral 101, the PC 103, the cloud server 104, etc. that are connected to the network 105.

Moreover, in the present embodiment, the controller unit 200a and the controller unit 200b may include configuration elements other than the above-described configuration elements. For example, the controller unit 200a and the controller unit 200b may include an I/F for a modem device. In a configuration that includes the I/F for the modem device, the multifunction peripheral 101 and the multifunction peripheral 102 are connected to a public line by a modem, which is connected to the I/F for the modem device, and can perform fax communications with an external apparatus. Further, the controller unit 200a and the controller unit 200b may be provided with a USB (Universal Serial Bus) I/F. In a configuration that includes the USB I/F, the multifunction peripheral 101 and the multifunction peripheral 102 can read out data stored in a USB memory connected to the USB I/F and then print the data, which is read out.

Figure 3A:
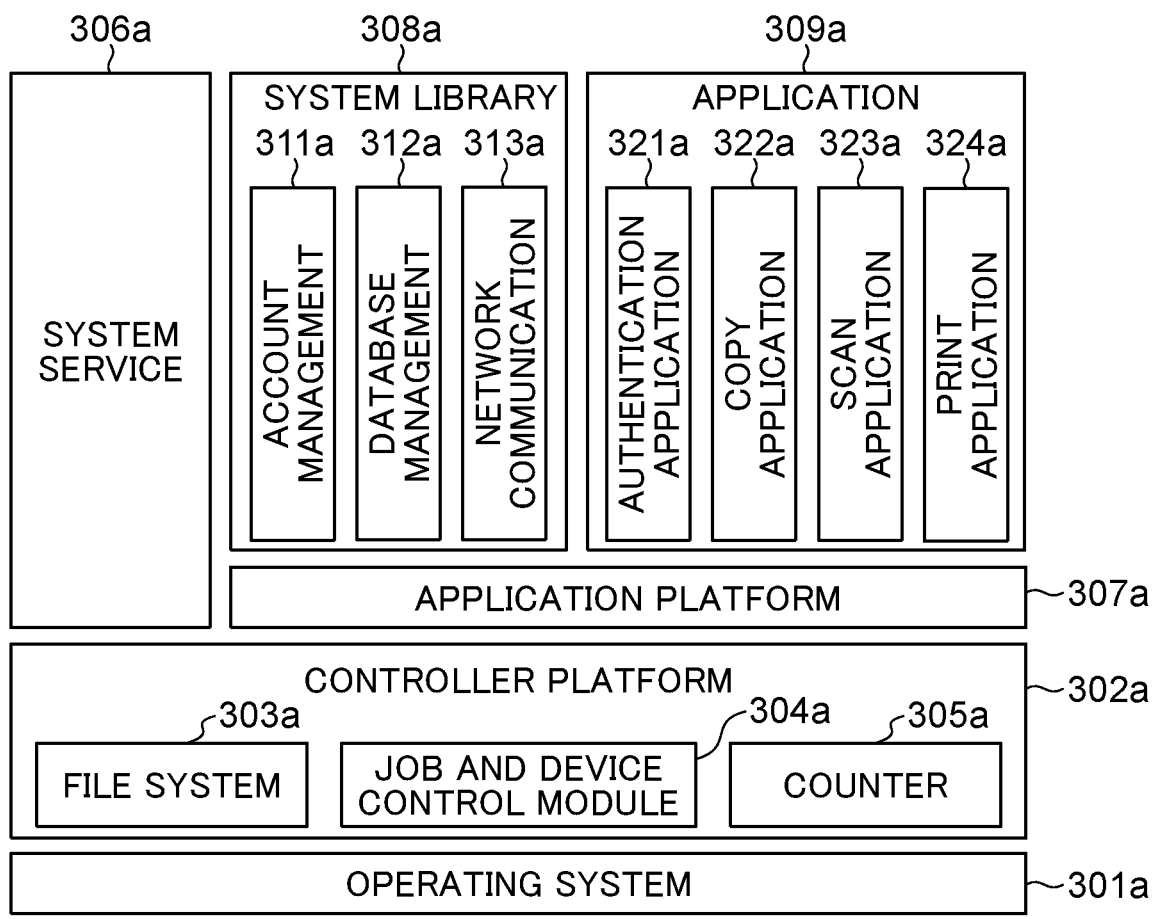
FIG. 3A is a block diagram that schematically shows a software configuration of the multifunction peripheral 101 of FIG. 1.
Figure 3B:
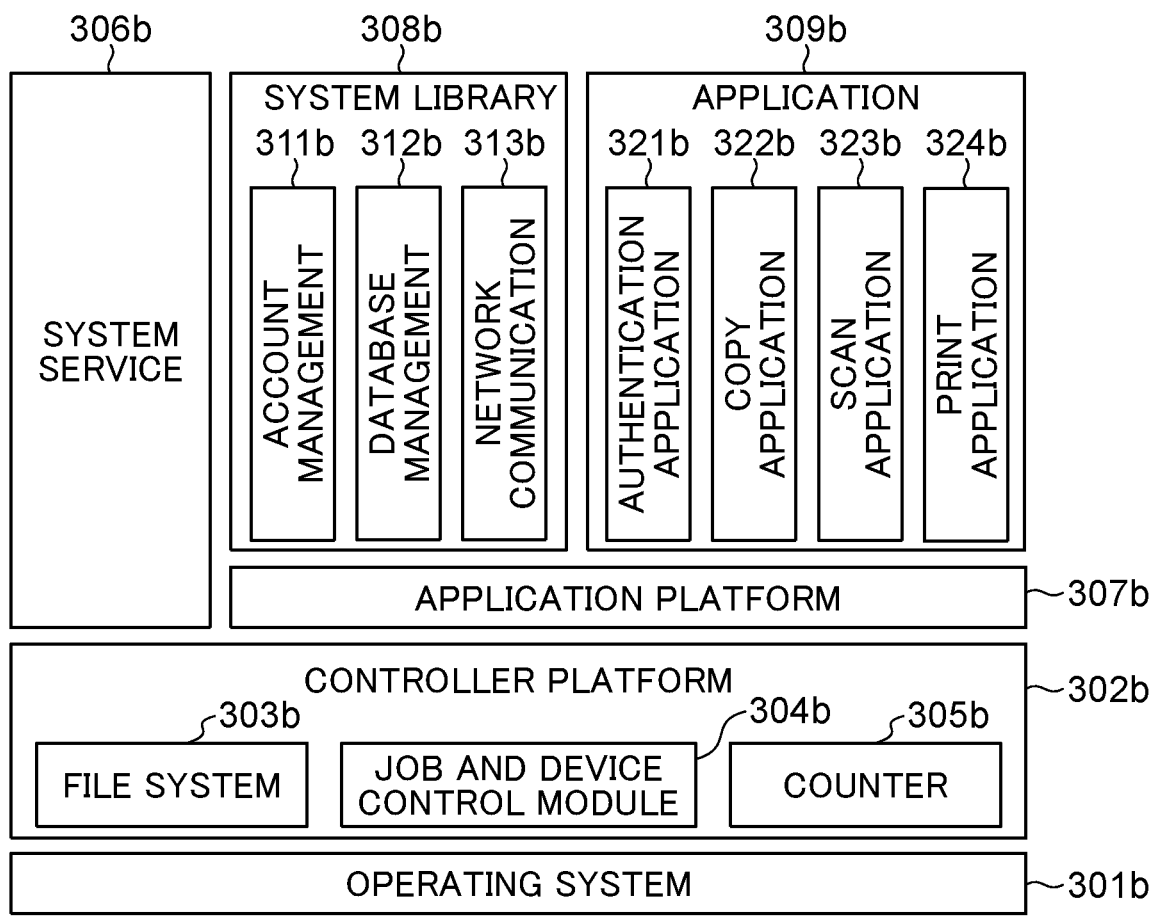
FIG. 3B is a block diagram that schematically shows a software configuration of the multifunction peripheral 102 of FIG. 1.

FIGS. 3A and 3B are block diagrams that schematically show software configurations of the multifunction peripheral 101 and the multifunction peripheral 102 of FIG. 1. FIG. 3A schematically shows the software configuration of the multifunction peripheral 101. In the multifunction peripheral 101, the software, which is processed by the controller unit 200a, is implemented as so-called firmware, and is executed by the CPU 201a.

An operating system 301a provides software running on the said operating system 301a with services and frameworks of various kinds of resource management optimized for the control of embedded systems. The services and frameworks of various kinds of resource management, which are provided by the operating system 301a, are multitask management that allows a plurality of processes to operate substantially in parallel by managing multiple execution contexts of processes by the CPU 201a, and inter-task communication that realizes synchronization and data exchange between tasks.

A controller platform 302a includes a file system 303a, a job and device control module 304a, and a counter 305a. The file system 303a is a mechanism for storing data constructed on the storage device such as the HDD 204a or the RAM 202a, and is used for spooling jobs handled by the controller unit 200a and storing various kinds of data. The job and device control module 304a controls the hardware of the multifunction peripheral 101. Further, the job and device control module 304a controls the execution of jobs that mainly use basic functions (a print function, a scan function, a communication function, an image conversion function, etc.) that are provided by the hardware. The counter 305a manages an expiration date and time for each application, and counter values based on usage records of the print function and the scan function.

A system service 306a monitors an operating status of the multifunction peripheral 101, and also downloads software and licenses from a software distribution server via the network 105.

An application platform 307a is middleware for making mechanisms of the operating system 301a and the controller platform 302a available from a system library 308a and an application 309a, which will be described later.

The system library 308a is a software module that provides services that can be used from the application 309a, and has an account management 311a, a database management 312a, and a network communication 313a.

The application 309a is a software module that provides the user with various functions that are realized by the multifunction peripheral 101. The application 309a has an authentication application 321a, a copy application 322a, a scan application 323a, and a print application 324a.

The authentication application 321a manages users who can use the multifunction peripheral 101 by means of the account management 311a in the system library 308a. The account management 311a communicates with an authentication application 410 described later of the cloud server 104 by means of the network communication 313a to perform the user authentication. In the user authentication, a user name and a password, which are inputted into the operating unit 206a by the user, are collated by communications with the authentication application 410 described later.

The copy application 322a accesses the job and device control module 304a via the application platform 307a, and provides the copy function of a paper document. Further, the scan application 323a accesses the job and device control module 304a via the application platform 307a, and provides a function that scans the paper document and then convert it into electronic data.

In a case that a remote print function is set to enabled, the print application 324a temporarily stores the received print job in the RAM 202a or the like without immediately performing the printing of the received print job (hereinafter, referred to as "the print application 324a holds the received print job" or "the received print job is held by the print application 324a"), and generates bibliographic information of the held print job. The print application 324a transmits a registration request of the generated bibliographic information to the cloud server 104. Further, the print application 324a obtains the bibliographic information from the cloud server 104 by means of the network communication 313a, and then displays a print queue on the operating unit 206a based on the obtained bibliographic information. The user can select the print queue displayed on the operating unit 206a, change the setting of the print job corresponding to the selected print queue, for example, the setting of the sheet feeding stage used for printing, and issue an execution instruction of the print job having the changed setting. The print application 324a provides a function of transmitting a print request notification, which requests the printing of the print job stored in the HDD 204b of the multifunction peripheral 102, to another multifunction peripheral, for example, the multifunction peripheral 102 by means of the network communication 313a. Further, the print application 324a provides a function of accessing the job and device control module 304a via the application platform 307a and executing the printing of the print job stored in the HDD 204a.

FIG. 3B schematically shows the software configuration of the multifunction peripheral 102. In the multifunction peripheral 102, the software, which is processed by the controller unit 200b, is implemented as so-called firmware, and is executed by the CPU 201b.

An operating system 301b provides software running on the said operating system 301b with services and frameworks of various kinds of resource management optimized for the control of embedded systems. The services and frameworks of various kinds of resource management, which are provided by the operating system 301b, are multitask management that allows a plurality of processes to operate substantially in parallel by managing multiple execution contexts of processes by the CPU 201b, and inter-task communication that realizes synchronization and data exchange between tasks.

A controller platform 302b includes a file system 303b, a job and device control module 304b, and a counter 305b. The file system 303b is a mechanism for storing data constructed on the storage device such as the HDD 204b or the RAM 202b, and is used for spooling jobs handled by the controller unit 200b and storing various kinds of data. The job and device control module 304b controls the hardware of the multifunction peripheral 102. Further, the job and device control module 304b controls the execution of jobs that mainly use basic functions (a print function, a scan function, a communication function, an image conversion function, etc.) that are provided by the hardware. The counter 305b manages an expiration date and time for each application, and counter values based on usage records of the print function and the scan function.

A system service 306b monitors an operating status of the multifunction peripheral 102, and also downloads software and licenses from the software distribution server via the network 105.

An application platform 307b is middleware for making mechanisms of the operating system 301b and the controller platform 302b available from a system library 308b and an application 309b, which will be described later.

The system library 308b is a software module that provides services that can be used from the application 309b, and has an account management 311b, a database management 312b, and a network communication 313b.

The application 309b is a software module that provides the user with various functions that are realized by the multifunction peripheral 102. The application 309b has an authentication application 321b, a copy application 322b, a scan application 323b, and a print application 324b.

The authentication application 321b manages users who can use the multifunction peripheral 102 by means of the account management 311b in the system library 308b. The account management 311b communicates with the authentication application 410 described later of the cloud server 104 by means of the network communication 313b to perform the user authentication. In the user authentication, a user name and a password, which are inputted into the operating unit 206b by the user, are collated by communications with the authentication application 410 described later.

The copy application 322b accesses the job and device control module 304b via the application platform 307b, and provides the copy function of the paper document. Further, the scan application 323b accesses the job and device control module 304b via the application platform 307b, and provides a function that scans the paper document and then convert it into electronic data.

In a case that the remote print function is set to enabled, the print application 324b holds the received print job, and generates bibliographic information of the held print job. The print application 324b transmits a registration request of the generated bibliographic information to the cloud server 104. Further, the print application 324b obtains the bibliographic information from the cloud server 104 by means of the network communication 313b, and then displays a print queue on the operating unit 206b based on the obtained bibliographic information. The user can select the print queue displayed on the operating unit 206b, change the setting of the print job corresponding to the selected print queue, for example, the setting of the sheet feeding stage used for printing, and issue an execution instruction of the print job having the changed setting. The print application 324b provides a function of transmitting a print request notification, which requests the printing of the print job stored in the HDD 204a of the multifunction peripheral 101, to another multifunction peripheral, for example, the multifunction peripheral 101 by means of the network communication 313b. Further, the print application 324b provides a function of accessing the job and device control module 304b via the application platform 307b and executing the printing of the print job stored in the HDD 204b.

FIG. 4 is a block diagram that schematically shows a software configuration of the cloud server 104 of FIG. 1. A plurality of software modules, specifically, an infrastructure 401, a cloud platform 402, and an application 407 are implemented in the cloud server 104.

The infrastructure 401 is a foundation for the cloud server 104 to provide services, and is configured by a server, a virtual machine, a storage, a network, and an operating system. The cloud platform 402 is a framework that provides common basic functions to the application 407 by utilizing the infrastructure 401. The cloud platform 402 is configured by a file system 403, an account job control module 404, and a database 405.

The application 407 communicates with a web browser operating on the PC 103, displays a menu on a web browser screen of the PC 103, and accepts an instruction, which is inputted into the said menu by the user. The application 407 provides the user with various functions that use the multifunction peripheral 101 and the multifunction peripheral 102. Further, the application 407 manages accounts of the users who use the multifunction peripheral 101 and the multifunction peripheral 102, and visualizes usage statistics of the multifunction peripheral 101 and the multifunction peripheral 102. The application 407 includes the authentication application 410, a device management application 411, a setting application 412, a bibliographic information management application 413, and a usage statistics application 414.

The authentication application 410 manages the users who are permitted to use the multifunction peripheral 101 and the multifunction peripheral 102 by means of the account job control module 404. The authentication application 410 receives the user name and the password to be authenticated from the authentication application 321a of the multifunction peripheral 101 or the authentication application 321b of the multifunction peripheral 102 via the network, and then collates the received user name and the received password. Moreover, in the user authentication, an external authentication server such as Active Directory or LDAP (Lightweight Directory Access Protocol) may be used without using the account job control module 404 in the cloud platform 402.

The device management application 411 performs device management such as registration, editing, and deletion of devices to be managed such as the multifunction peripheral 101 and the multifunction peripheral 102. The setting application 412 performs settings of the functions that are provided by the cloud server 104 to the user. The bibliographic information management application 413 manages the bibliographic information corresponding to the print jobs stored in the multifunction peripheral 101 and the multifunction peripheral 102, which are registered in the device management application 411, for each user registered in the authentication application 410. The usage statistics application 414 displays statistical information about the usage records of functions such as the print function and the scan function. The statistical information is displayed on the web browser screen of the PC 103 for each multifunction peripheral registered in the device management application 411 or for each user registered in the authentication application 410.

Next, screens displayed on the multifunction peripheral working as the output device in the printing system 100 will be described. Hereinafter, as an example, a case that screens described later are displayed on the operating unit 206b of the multifunction peripheral 102 working as the output device will be described.

Figure 5A:
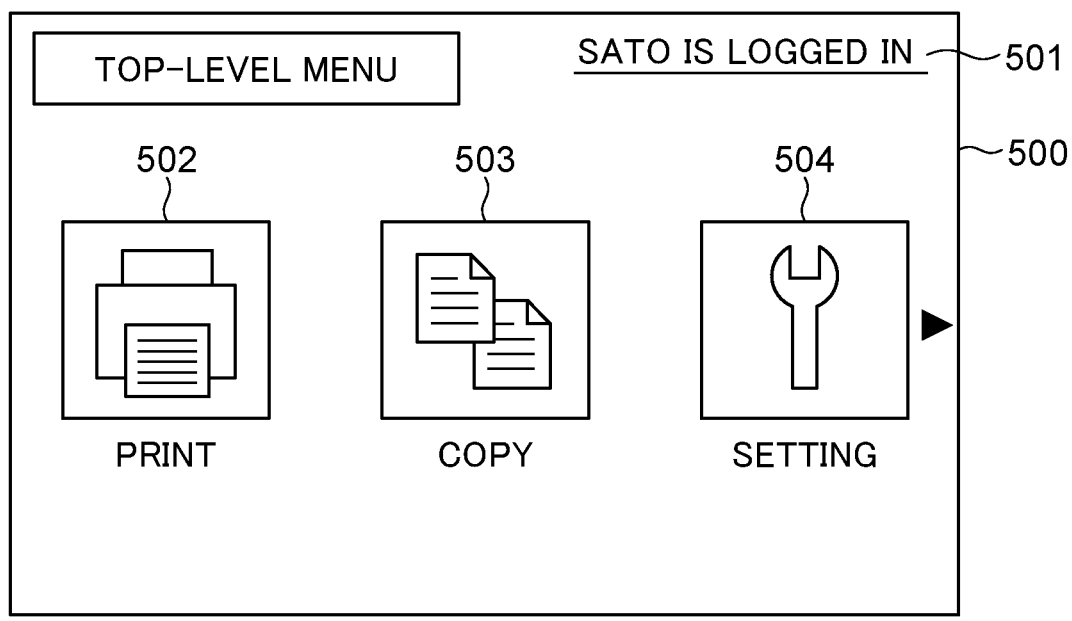
FIGS. 5A, 5B, 5C and 5D are figures that show examples of screens displayed on an operating unit of FIG. 2B.

FIGS. 5A, 5B, 5C and 5D are figures that show examples of the screens displayed on the operating unit 206b of FIG. 2B. FIG. 5A is a figure that shows one example of a top-level menu screen 500 displayed on the operating unit 206b.

When the user logs in to the multifunction peripheral 102 by using an IC (integrated circuit) card or the like, the top-level menu screen 500 will be displayed on the operating unit 206b of the multifunction peripheral 102. As a result, the user can select the application to be used from the top-level menu screen 500. A message 501, which indicates that the user ("Sato" in FIG. 5A) is logged in to the multifunction peripheral 102, is displayed on the top-level menu screen 500.

Icons corresponding to each application equipped in the multifunction peripheral 102 are displayed on the top-level menu screen 500. A print icon 502 is an icon corresponding to the print application 324b. When the user presses the print icon 502, the print application 324b is activated, and a print queue screen 505 of FIG. 5B, which will be described later, is displayed on the operating unit 206b. A copy icon 503 is an icon corresponding to the copy application 322b. When the user presses the copy icon 503, the copy application 322b is activated. A setting icon 504 is an icon of an application for performing settings related to the multifunction peripheral 102 among the plurality of applications constituting the application 309b.

Figure 5B:
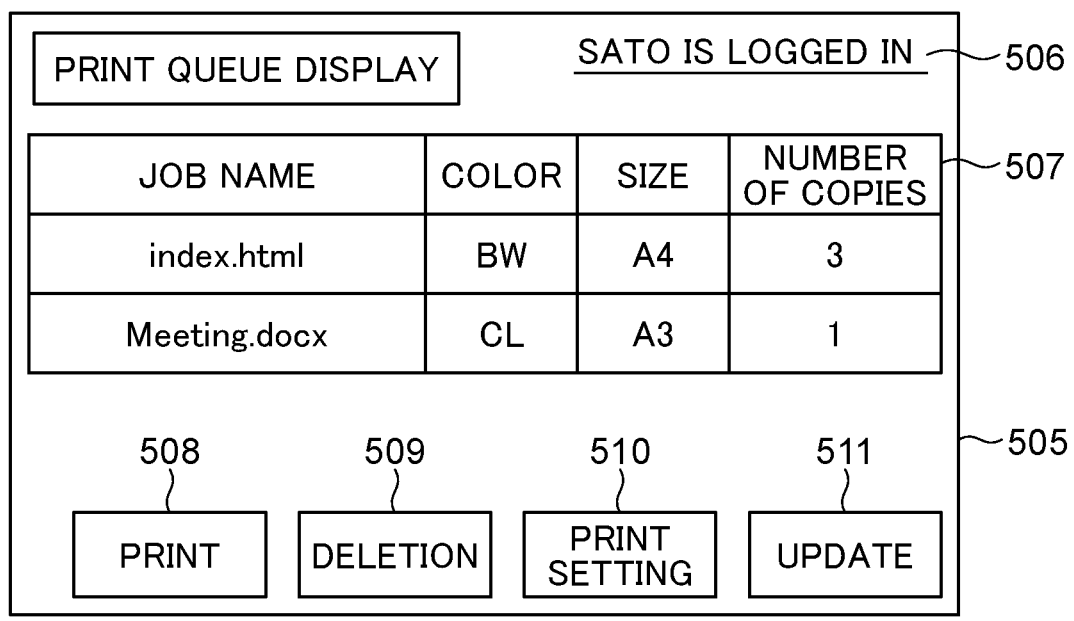

FIG. 5B is a figure that shows one example of the print queue screen 505, which is displayed on the operating unit 206b when the user has pressed the print icon 502. As with the top-level menu screen 500, a message 506, which indicates that the user ("Sato" in FIG. 5B) is logged in to the multifunction peripheral 102, is also displayed on the print queue screen 505. A list of print jobs corresponding to the user logged in to the multifunction peripheral 102 (i.e., an authenticated user) is displayed on the print queue screen 505.

The print queue screen 505 is displayed on the operating unit 206b by the print application 324b, which is executed by the CPU 201b. The print application 324b obtains bibliographic information corresponding to the user logged in to the multifunction peripheral 102 ("Sato" being the authenticated user) from the cloud server 104 that manages the bibliographic information, and then displays a list of print jobs corresponding to the obtained bibliographic information on a list 507 of the print queue screen 505. FIG. 5B shows, as an example, a status that information about two print jobs is displayed on the list 507. The job name, a color/monochrome setting, a sheet size setting, and a copy number setting for each print job are displayed on the list 507.

When the user selects one print job from the plurality of the print jobs displayed on the list 507 and further selects one of a print button 508, a deletion button 509, a print setting button 510, and an update button 511, a processing corresponding to the selected button is performed with respect to the selected printed job. The print button 508 is a button for instructing the start of printing of the selected print job. The deletion button 509 is a button for instructing the deletion of the selected print job. The print setting button 510 is a button for instructing the change of the print setting of the selected print job. When the user presses the print setting button 510, a print setting screen 512 of FIG. 5C will be displayed on the operating unit 206b. The update button 511 is a button for instructing the update of display contents of the list 507. When the user presses the update button 511, the print application 324b obtains the bibliographic information corresponding to the user logged in to the multifunction peripheral 102 from the cloud server 104, and then updates the display contents of the list 507, which shows the list of the print jobs corresponding to the obtained bibliographic information.

Figure 5C:
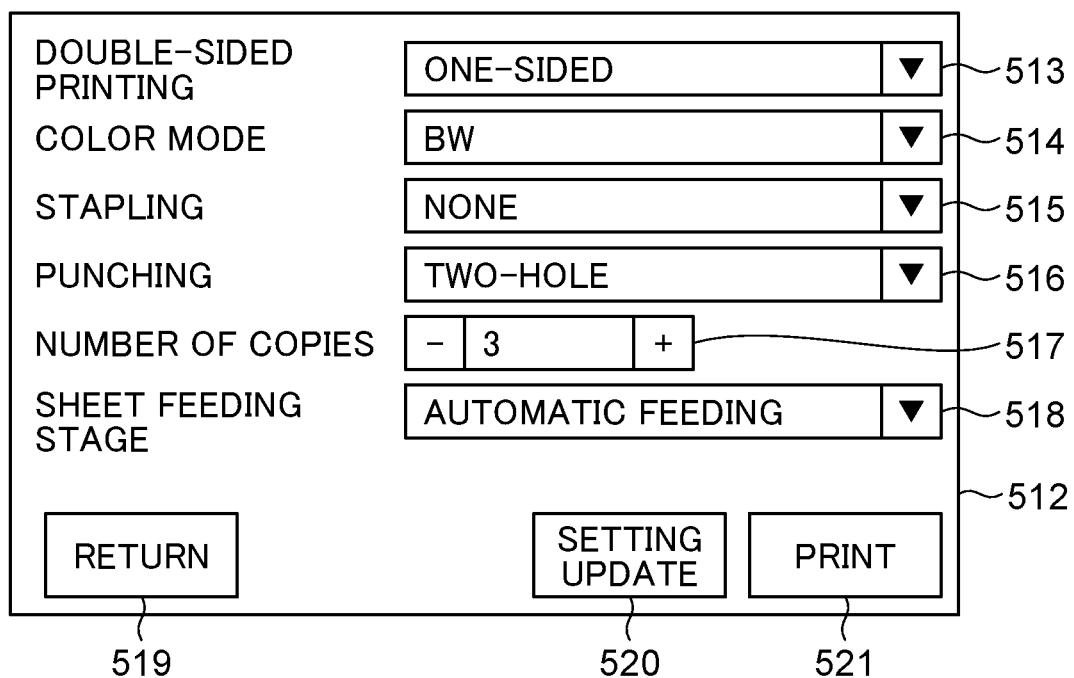
Figure 5D:
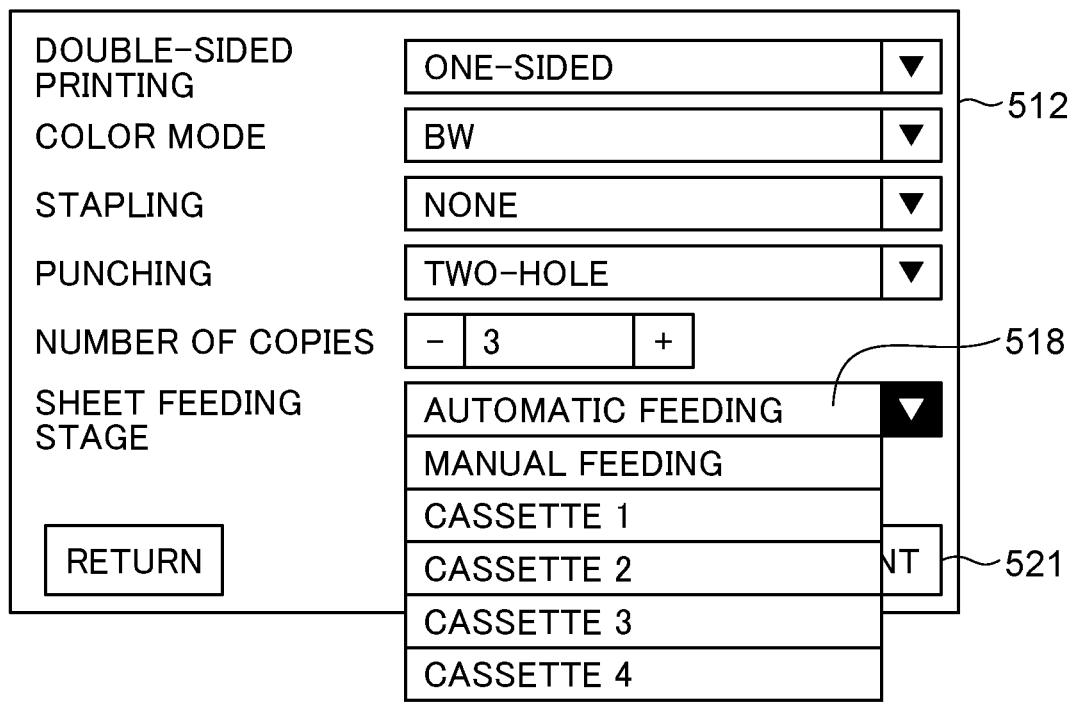

FIG. 5C is a figure that shows one example of the print setting screen 512, which is displayed on the operating unit 206b when the user has pressed the print setting button 510. The change of the print setting of the print job, which is selected on the print queue screen 505, is performed on the print setting screen 512. The print setting screen 512 includes a plurality of setting fields corresponding to the print setting of the print job selected on the print queue screen 505, a return button 519, a setting update button 520, and a print button 521. Specifically, the plurality of setting fields is a double-sided printing setting field 513, a color mode setting field 514, a stapling setting field 515, a punching setting field 516, a copy number setting field 517, and a sheet feeding stage setting field 518. When the user has pressed the print setting button 510, the print setting screen 512 is displayed on the operating unit 206b in a state that values of the print setting of the print job selected on the print queue screen 505 are set in each setting field. The user can select a desired setting field from these setting fields and change the setting value. For example, when the user presses the sheet feeding stage setting field 518, as shown in FIG. 5D, selection options of the sheet feeding stage setting, which can be set in the sheet feeding stage setting field 518, are displayed. The selection options of the sheet feeding stage setting are, for example, "automatic feeding", "manual feeding", "cassette 1", "cassette 2", "cassette 3", and "cassette 4", and are determined based on a configuration of a sheet feeding unit of the multifunction peripheral 102. Moreover, since the configuration of the sheet feeding unit differs depending on a model of the multifunction peripheral, the selection options, which are displayed on the sheet feeding stage setting field 518, differ depending on the model of the multifunction peripheral. When the user selects a selection option corresponding to the sheet feeding stage, in which the desired printing sheet is stored, and presses the print button 521, the multifunction peripheral 102 uses the printing sheet stored in the sheet feeding stage corresponding to the selected selection option, and starts the printing of the print job selected on the print queue screen 505.

The return button 519 is a button for instructing the cancellation of the change of the print setting on the print setting screen 512. The setting update button 520 is a button for instructing to change the print setting of the print job selected on the print queue screen 505 to the value set on the print setting screen 512. When the user presses the setting update button 520 after changing the print setting on the print setting screen 512, for example, in the case that the target print job is a print job stored in the HDD 204b of the multifunction peripheral 102, the print application 324b changes the print setting of the said print job. Further, the print application 324b generates bibliographic information of the print job whose print setting has been changed, and requests the cloud server 104 to update the bibliographic information based on the generated bibliographic information. The print button 521 is a button for instructing to use the print setting set on the print setting screen 512 and start the printing of the print job selected on the print queue screen 505. When the user presses the print button 521 after changing the print setting on the print setting screen 512, the print application 324b uses the print setting changed by the user and starts the printing of the print job selected on the print queue screen 505. Further, the print application 324a generates bibliographic information of the changed print setting, and requests the cloud server 104 to update the bibliographic information based on the generated bibliographic information.

Figure 6A:
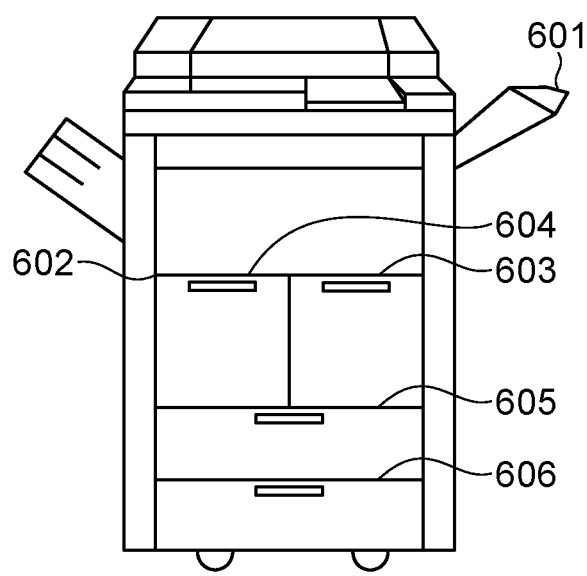
FIGS. 6A and 6B are figures for explaining a configuration of a sheet feeding unit of the multifunction peripheral 101 of FIG. 1, and FIGS. 6C and 6D are figures for explaining a configuration of a sheet feeding unit of the multifunction peripheral 102 of FIG. 1.
Figure 6C:
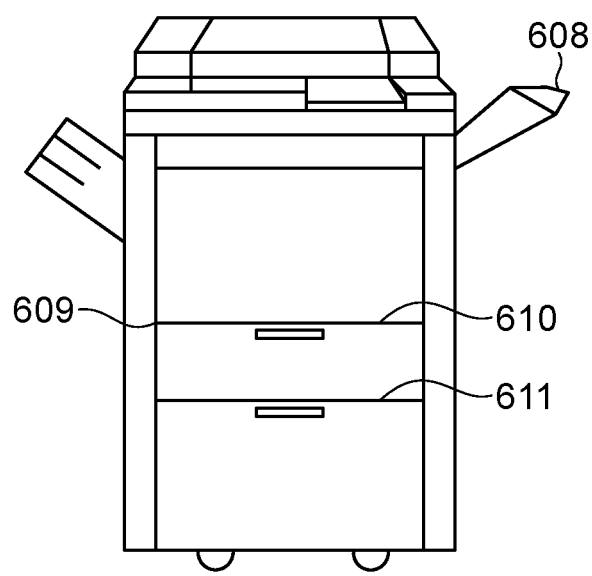

FIGS. 6A and 6B are figures for explaining a configuration of a sheet feeding unit of the multifunction peripheral 101 of FIG. 1, and FIGS. 6C and 6D are figures for explaining the configuration of the sheet feeding unit of the multifunction peripheral 102 of FIG. 1. FIG. 6A is a schematic view that shows the configuration of the sheet feeding unit of the multifunction peripheral 101. The multifunction peripheral 101 includes a manual feeding cassette 601 and a sheet feeding cassette 602, which is configured by a plurality of sheet feeding stages, as the sheet feeding unit. The sheet feeding cassette 602 includes a cassette 603, a cassette 604, a cassette 605, and a cassette 606 (hereinafter, also referred to as "the cassettes 603 to 606"). For example, in the case that "manual feeding" corresponding to the manual feeding cassette 601 is set in the sheet feeding stage setting field 518, the user manually sets the desired sheet to be used for printing in the manual feeding cassette 601. Printing sheets of the type and size that can be printed by the multifunction peripheral 101 are stored in the cassettes 603 to 606, respectively. Printing sheets of different types or sizes may be stored in the cassettes 603 to 606, respectively. In the setting of the sheet feeding stage of the print job, the user specifies a cassette, in which sheets of a desired type or size to be used for printing are stored, from the cassettes 603 to 606.

FIG. 6B is a figure that shows one example of a correspondence table 607, which shows a correspondence relationship between display names and control setting values of the cassettes constituting the sheet feeding unit of the multifunction peripheral 101. The correspondence table 607 is stored in, for example, the HDD 204a or the like. The display names, which are displayed as the selection options of the sheet feeding stage setting field 518, are set in the correspondence table 607. For example, "manual feeding" that is the display name of the manual feeding cassette 601, "cassette 1" that is the display name of the cassette 603, "cassette 2" that is the display name of the cassette 604, "cassette 3" that is the display name of the cassette 605, and "cassette 4" that is the display name of the cassette 606 are set in the correspondence table 607 of FIG. 6B. The print application 324a, which controls the display of the print setting screen 512, retains the display names set in the correspondence table 607 as a software program. When the user has pressed the sheet feeding stage setting field 518 on the print setting screen 512, the print application 324a displays all the display names set in the correspondence table 607.

Further, the control setting values are set in the correspondence table 607 in such a way of being associated with each display name. Different control setting values are assigned to the plurality of cassettes equipped in the multifunction peripheral 101, respectively. The control setting values are setting values used for controlling the sheet feeding stage in a printing processing, and are different from the above display names. For example, "10" that is the control setting value of the manual feeding cassette 601, "21" that is the control setting value of the cassette 603, "22" that is the control setting value of the cassette 604, "11" that is the control setting value of the cassette 605, and "12" that is the control setting value of the cassette 606 are set in the correspondence table 607 of FIG. 6B in the way of being associated with the display names corresponding to these control setting values. The application 309a notifies the device interface 207a of the control setting value and performs the control of the sheet feeding stage.

FIG. 6C is a schematic view that shows the configuration of the sheet feeding unit of the multifunction peripheral 102. The multifunction peripheral 102 includes a manual feeding cassette 608 and a sheet feeding cassette 609, which is configured by a plurality of sheet feeding stages, as the sheet feeding unit. The sheet feeding cassette 609 includes a cassette 610 and a cassette 611. Printing sheets of the type and size that can be printed by the multifunction peripheral 102 are accommodated in the cassette 610 and the cassette 611, respectively.

FIG. 6D is a figure that shows one example of a correspondence table 612, which shows a correspondence relationship between display names and control setting values of the cassettes constituting the sheet feeding unit of the multifunction peripheral 102. The correspondence table 612 is stored in, for example, the HDD 204b or the like. The display names, which are displayed as the selection options of the sheet feeding stage setting field 518, are set in the correspondence table 612. For example, "manual feeding" that is the display name of the manual feeding cassette 608, "cassette 1" that is the display name of the cassette 610, and "cassette 2" that is the display name of the cassette 611 are set in the correspondence table 612 of FIG. 6D. Here, although the multifunction peripheral 102 has a different configuration of the sheet feeding unit from the multifunction peripheral 101, and the model is also different, in the multifunction peripheral 102, the same display names as that of the multifunction peripheral 101 such as "manual feeding", "cassette 1", and "cassette 2" are used.

Further, the control setting values are set in the correspondence table 612 in such a way of being associated with each display name. Different control setting values are assigned to the plurality of cassettes equipped in the multifunction peripheral 102, respectively. Here, the assignment of the control setting values is performed in the multifunction peripheral 101 and the multifunction peripheral 102, respectively. Therefore, different control setting values are assigned to the cassettes having the same display name for each multifunction peripheral, for example, for the cassette having the display name of "cassette 1", "21" is assigned as the control setting value in the multifunction peripheral 101, and on the other hand, "11" is assigned as the control setting value in the multifunction peripheral 102.

Next, operations of the multifunction peripheral 101 and the multifunction peripheral 102 in the remote printing by the printing system 100 will be described. Hereinafter, as one example, it is assumed that the multifunction peripheral 101 works as the document reception device and the multifunction peripheral 102 works as the output device.

Figure 7A:
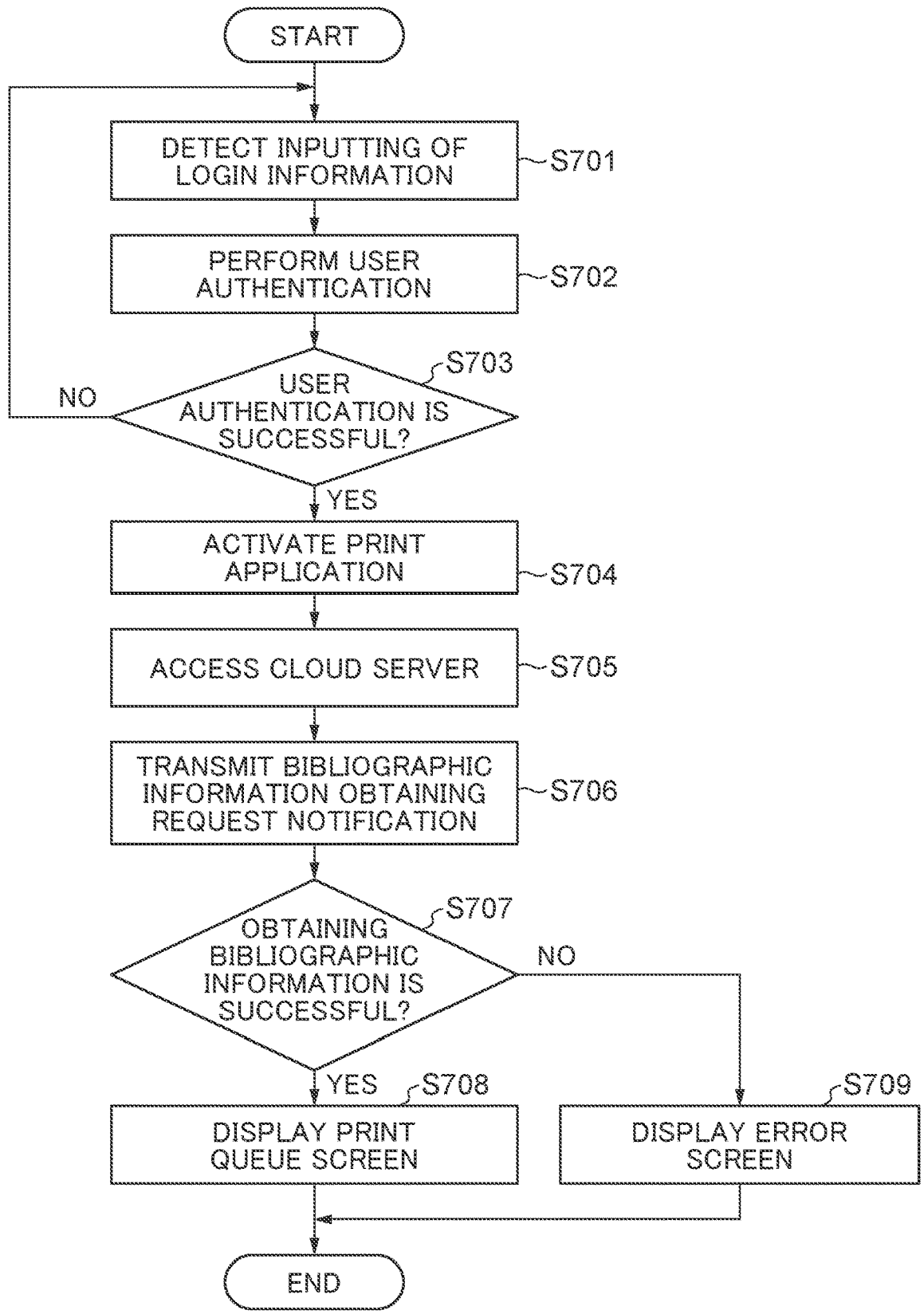
FIG. 7A is a flowchart that shows the procedure of a print queue list display processing, which is executed by the multifunction peripheral working as an output device in the printing system of FIG. 1.

FIG. 7A is a flowchart that shows the procedure of a print queue list display processing, which is executed by the multifunction peripheral 102 working as the output device in the printing system 100 of FIG. 1. The print queue list display processing of FIG. 7A is realized by the CPU 201b executing the program stored in the ROM 203b or the HDD 204b. In the print queue list display processing of FIG. 7A, it is assumed that an authentication screen (not shown) for accepting the input of login information is displayed on the operating unit 206b of the multifunction peripheral 102. The login information is the user name and the password for the user to log in to the multifunction peripheral 102.

As shown in FIG. 7A, when the CPU 201b detects that the user has inputted the login information into the authentication screen by operating the operating unit 206b (a step S701), the CPU 201b transmits the inputted login information from the operating unit 206b to the authentication application 321b.

Next, the CPU 201b performs the user authentication by means of the authentication application 321b (a step S702). Next, the CPU 201b judges whether or not the user authentication is successful (a step S703).

As a result of judging in the step S703, in the case that the user authentication is failed, the print queue list display processing returns to the step S701. Further, as the result of the judging in the step S703, in the case that the user authentication is successful, the CPU 201b notifies an authentication result from the authentication application 321b to the application 309b. Furthermore, the CPU 201b causes the operating unit 206b to display the top-level menu screen 500. Next, when the CPU 201b detects that the user has pressed the print icon 502 on the top-level menu screen 500, the CPU 201b activates the print application 324b (a step S704). Subsequent processing is executed by the print application 324b.

Next, the print application 324b accesses the cloud server 104 via the network communication 313b (a step S705). Next, the print application 324b transmits a bibliographic information obtaining request notification to the cloud server 104 (a step S706). The bibliographic information obtaining request notification includes the user name inputted in the step S701. As a response to the received bibliographic information obtaining request notification, the cloud server 104 transmits all the bibliographic information corresponding to the user name included in the bibliographic information obtaining request notification to the multifunction peripheral 102. The bibliographic information corresponding to the user name included in the bibliographic information obtaining request notification includes the bibliographic information corresponding to the print jobs stored in the multifunction peripheral other than the multifunction peripheral 102, for example, the multifunction peripheral 101. Next, the print application 324b judges whether or not obtaining the bibliographic information from the cloud server 104 is successful (a step S707).

As a result of judging in the step S707, in the case that obtaining the bibliographic information from the cloud server 104 is successful, the print application 324b causes the operating unit 206b to display the print queue screen 505 based on the obtained bibliographic information (a step S708). After that, the print queue list display processing is completed, and a setting change printing processing of FIG. 7B, which will be described later, is executed.

On the other hand, as the result of the judging in the step S707, in the case that obtaining the bibliographic information from the cloud server 104 is failed, the print application 324b causes the operating unit 206b to display an error screen (not shown) (a step S709). After that, the print queue list display processing is completed.

Figure 7B:
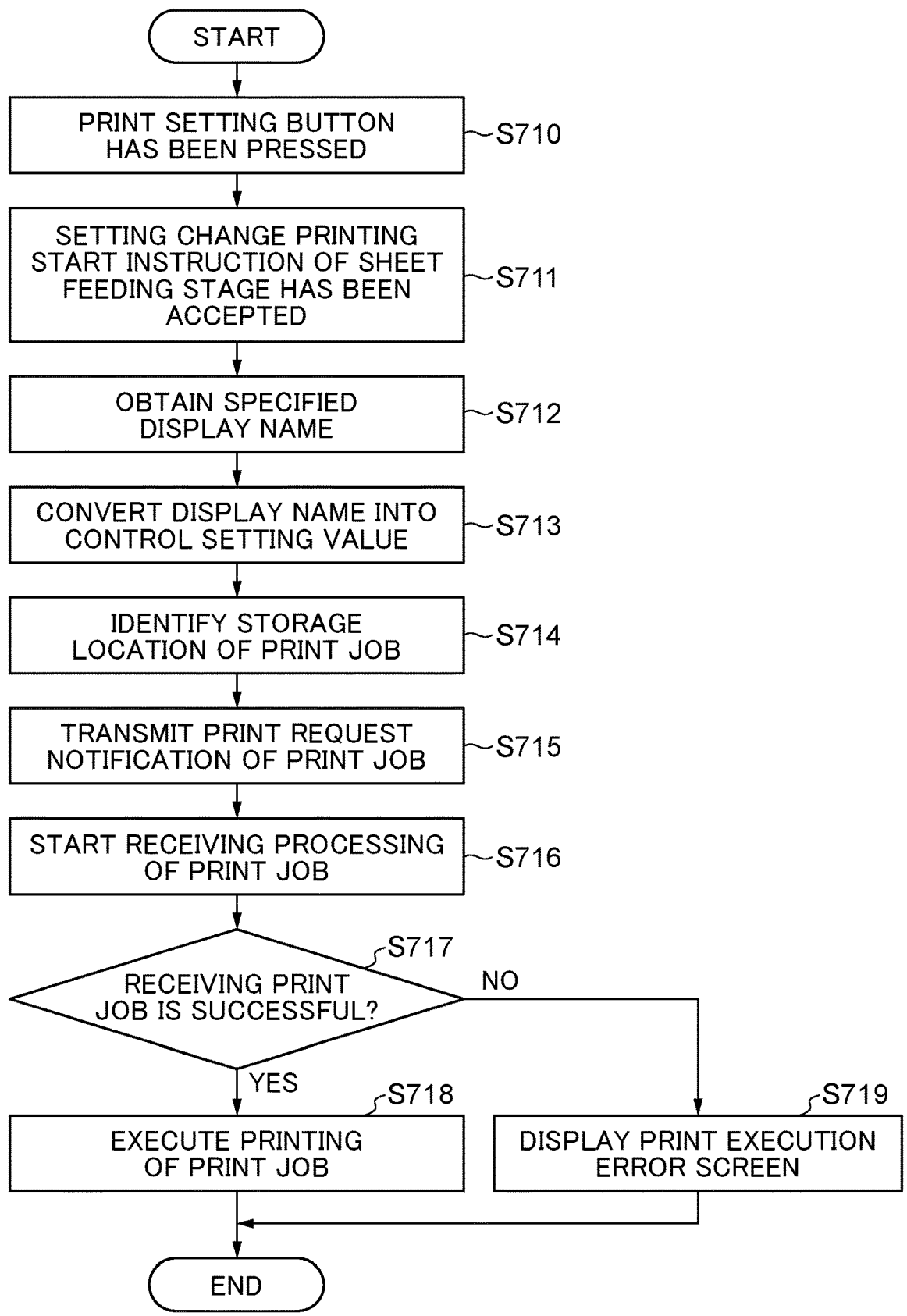
FIG. 7B is a flowchart that shows the procedure of a setting change printing processing, which is executed by the multifunction peripheral working as the output device in the printing system of FIG. 1.

FIG. 7B is a flowchart that shows the procedure of the setting change printing processing, which is executed by the multifunction peripheral 102 working as the output device in the printing system 100 of FIG. 1. As with the print queue list display processing, the setting change printing processing of FIG. 7B is also realized by the CPU 201b executing the program stored in the ROM 203b or the HDD 204b. The setting change printing processing of FIG. 7B is executed when the processing of the step S708 described above is executed and the print queue screen 505 is displayed on the operating unit 206b.

As shown in FIG. 7B, when the print application 324b detects that the user has selected one print job from the list of the print jobs displayed on the print queue screen 505 and then has pressed the print setting button 510 (a step S710), the print application 324b causes the operating unit 206b to display the print setting screen 512. Next, when the print application 324b detects that a setting change printing start instruction of the sheet feeding stage has been accepted on the print setting screen 512 (a step S711), the setting change printing processing proceeds to a step S712. In the step S711, as the setting change printing start instruction of the sheet feeding stage, the user operates the sheet feeding stage setting field 518 of the print setting screen 512 to specify one display name, and presses the print button 521 of the print setting screen 512.

In the step S712, the print application 324b obtains the display name, which is specified by the user in the sheet feeding stage setting field 518. Next, the print application 324b converts the obtained display name into the control setting value based on the correspondence table 612 (a step S713). For example, in the case that the display name obtained in the step S712 is "cassette 1", the CPU 201b converts "cassette 1" into "11", which is the control setting value associated with "cassette 1". Next, based on the bibliographic information obtained from the cloud server 104 by the print queue list display processing described above, the print application 324b identifies a storage location of the print job selected by the user in the step S710 (a step S714).

Next, the print application 324b transmits the print request notification of the print job selected by the user in the step S710 together with the control setting value converted in the step S713 to the storage location identified in the step S714 (a step S715). For example, in the case that the storage location identified in the step S714 is the multifunction peripheral 101, the print application 324b transmits "11" being the control setting value converted in the step S713 and the print request notification of the print job selected by the user in the step S710 to the multifunction peripheral 101. Next, the print application 324b starts a receiving processing of the print job corresponding to the print request notification (a step S716). Next, the print application 324b judges whether or not the print job corresponding to the print request notification has been successfully received (a step S717). In the step S717, for example, in the case of receiving a success response indicating that transmission of the print job has been completed from the multifunction peripheral 101, which is a transmission destination of the print request notification, the print application 324b judges that the print job corresponding to the print request notification has been successfully received. On the other hand, in the case of receiving an error response indicating that the print job corresponding to the print request notification is not retained from the multifunction peripheral 101, which is the transmission destination of the print request notification, the print application 324b judges that the reception of the print job corresponding to the print request notification has failed.

As a result of judging in the step S717, in the case that the print job corresponding to the print request notification has been successfully received, the print application 324b performs the printing of the received print job (a step S718) (a print control means), and the setting change printing processing is completed. On the other hand, as the result of the judging in the step S717, in the case that the reception of the print job corresponding to the print request notification has failed, the print application 324b causes the operating unit 206b to display a print execution error screen (not shown), which indicates that the print execution has failed (a step S719). After that, the setting change printing processing is completed.

Figure 8:
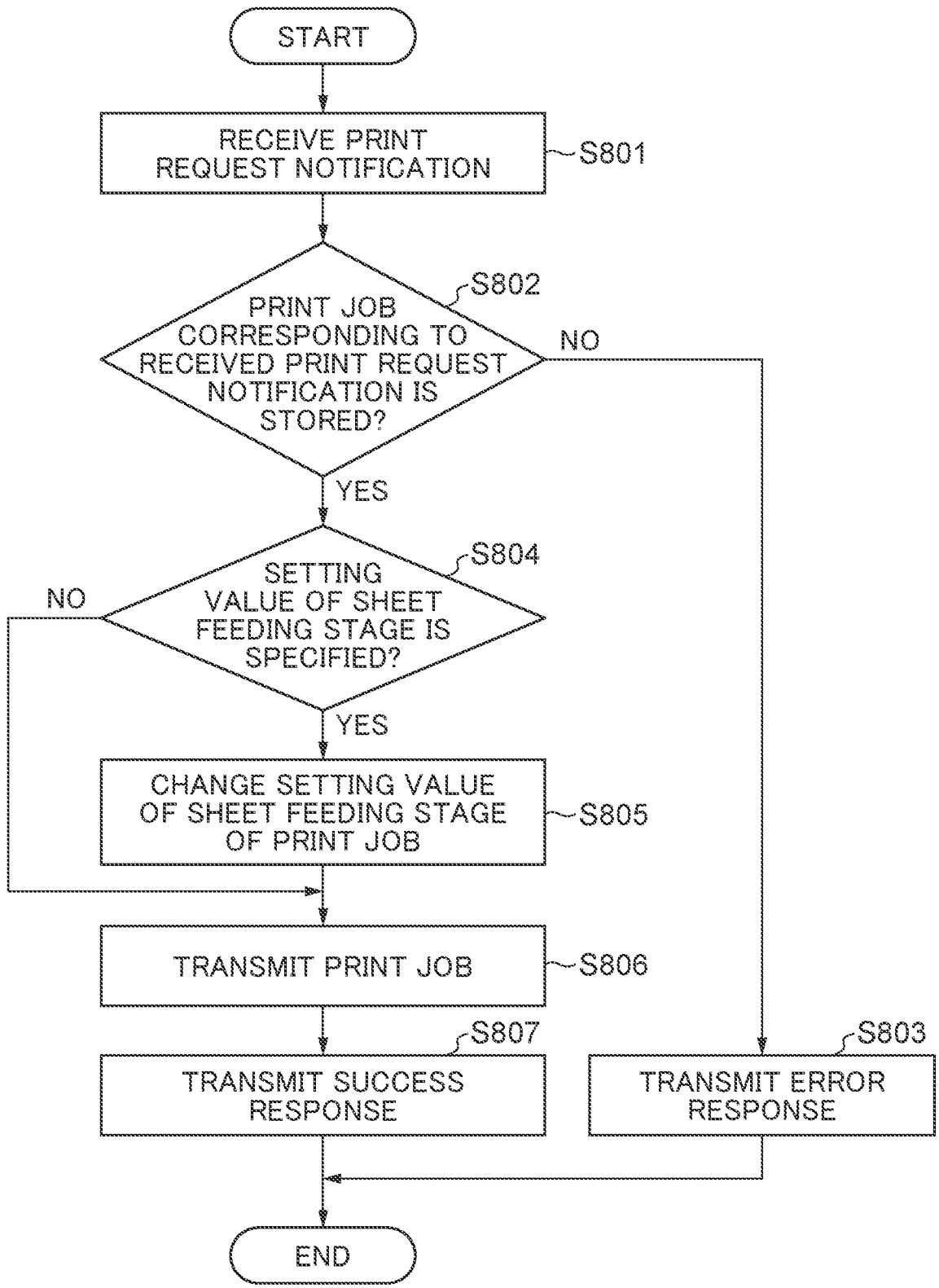
FIG. 8 is a flowchart that shows the procedure of a print job transmitting processing, which is executed by the multifunction peripheral working as a document reception device (i.e., an input device) in the printing system of FIG. 1.

FIG. 8 is a flowchart that shows the procedure of a print job transmitting processing, which is executed by the multifunction peripheral 101 working as the document reception device in the printing system 100 of FIG. 1. The cassette setting change processing of FIG. 8 is realized by the CPU 201a executing the program stored in the ROM 203a or the HDD 204a, and is executed by the print application 324a.

As shown in FIG. 8, when the multifunction peripheral 101 receives the print request notification of the print job from another multifunction peripheral, for example, the multifunction peripheral 102 (a step S801), the print application 324a judges whether or not the print job corresponding to the received print request notification is stored in the HDD 204a (a step S802).

As a result of judging in the step S802, in the case that the print job corresponding to the received print request notification is not stored in the HDD 204a, the print application 324a transmits an error response, which indicates that the print job corresponding to the received print request notification is not stored in the HDD 204a, to the multifunction peripheral 102, which is a transmission source of the print request notification (a step S803). After that, the print job transmitting processing is completed.

On the other hand, as the result of the judging in the step S802, in the case that the print job corresponding to the received print request notification is stored in the HDD 204a, the print application 324a judges whether or not the setting value of the sheet feeding stage is specified together with the received print request notification (a step S804). In the step S804, for example, in the case that the multifunction peripheral 101 has received the print request notification and the control setting value, which is the setting value of the sheet feeding stage, from the multifunction peripheral 102, the print application 324a judges that the setting value of the sheet feeding stage is specified together with the received print request notification. On the other hand, in the case that the multifunction peripheral 101 has received only the print request notification from the multifunction peripheral 102, the print application 324a judges that the setting value of the sheet feeding stage is not specified together with the received print request notification.

As a result of judging in the step S804, in the case that the setting value of the sheet feeding stage is not specified together with the received print request notification, the print job transmitting processing proceeds to a processing of a step S806, which will be described later. On the other hand, as the result of the judging in the step S804, in the case that the setting value of the sheet feeding stage is specified together with the received print request notification, the print application 324a changes the setting value of the sheet feeding stage of the print job corresponding to the received print request notification to the received control setting value (a step S805). Next, the print application 324a transmits the print job corresponding to the received print request notification to the multifunction peripheral 102, which is the transmission source of the print request notification (the step S806). For example, in the case that the setting value of the sheet feeding stage has specified together with the received print request notification, in the step S806, the print job, in which the setting value of the sheet feeding stage is changed to the control setting value received from the multifunction peripheral 102, is transmitted to the multifunction peripheral 102. Next, the print application 324a transmits the success response to the multifunction peripheral 102, which is the transmission source of the print request notification (a step S807). After that, the print job transmitting processing is completed.

According to the above-described embodiment, the multifunction peripheral 102 converts the display name of the sheet feeding stage, which is specified by the user from among the plurality of sheet feeding stages, into the control setting value used for controlling the said sheet feeding stage. The multifunction peripheral 102 executes the printing processing based on the print job, which is obtained from the multifunction peripheral 101 and in which the setting value of the sheet feeding stage of the print job specified by the user is changed to the above control setting value. As a result, in the remote printing, it is possible to perform the printing of the print job, in which the change of the setting value of the sheet feeding stage is correctly reflected.

Further, in the above-described embodiment, the multifunction peripheral 102 transmits the control setting value to the multifunction peripheral 101 together with the print request notification of the print job, and obtains the print job, in which the setting value of the sheet feeding stage of the print job specified by the user is changed to the above control setting value, from the multifunction peripheral 101. As a result, in the remote printing, it is possible to obtain the print job, in which the change of the setting value of the sheet feeding stage is correctly reflected, from the multifunction peripheral 101.

Furthermore, in the above-described embodiment, in the multifunction peripheral 101 and the multifunction peripheral 102, different control setting values are assigned to the same display name of the sheet feeding stage. As a result, between the multifunction peripherals that different control setting values are assigned to the same display name of the sheet feeding stage, the change of the setting value of the sheet feeding stage in the remote printing can be correctly reflected in the print job.

Moreover, in the above-described embodiment, the configuration of the sheet feeding cassette 609 of the multifunction peripheral 102 is different from the configuration of the sheet feeding cassette 602 of the multifunction peripheral 101. As a result, between the multifunction peripherals that have sheet feeding cassettes with different configurations, the change of the setting value of the sheet feeding stage in the remote printing can be correctly reflected in the print job.

Although the present disclosure has been described above with reference to the above-described embodiment, the present disclosure is not limited to the above-described embodiment. For example, the multifunction peripheral 102, which is the output device, may change the setting value of the sheet feeding stage of the print job specified by the user to the above control setting value, instead of the multifunction peripheral 101, which is the document reception device. Specifically, the multifunction peripheral 102 obtains the print job corresponding to the print request notification of the print job from the multifunction peripheral 101, and changes the setting value of the sheet feeding stage of the obtained print job to the above control setting value (a setting value change means). As a result, without the multifunction peripheral 102, which is the output device, transmitting the control setting value to the multifunction peripheral 101, which is the document reception device, the change of the setting value of the sheet feeding stage in the remote printing can be correctly reflected in the print job.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-212707, filed Dec. 22, 2020, which is hereby incorporated by reference herein in its entirety.

What is claimed is:

1. A printing system including:
a printing apparatus; and
a storage apparatus,
wherein the printing apparatus comprises
a sheet feeding cassette configured to include a plurality of sheet feeding stages;
one or more first memories; and
one or more first processors that execute a set of first instructions to:
accept specifying of a sheet feeding stage, which is used when the printing apparatus executes a print job stored in the storage apparatus, from a user;
obtain a first setting value of the specified sheet feeding stage;
transmit identification information, which indicates the print job, and the obtained first setting value of the sheet feeding stage to the storage apparatus;
receive the print job, which includes the first setting value of the sheet feeding stage, from the storage apparatus; and
execute the received print job according to the first setting value of the sheet feeding stage, and
wherein the storage apparatus comprises
one or more second memories; and
one or more second processors that execute a set of second instructions to:
receive a print job, which includes a second setting value of a sheet feeding stage, from an external apparatus;
store the received print job;
receive the identification information, which indicates the print job, and the first setting value of the sheet feeding stage from the printing apparatus;
change a second setting value of a sheet feeding stage included in the print job indicated by the identification information to the received first setting value of the sheet feeding stage; and
transmit the print job, which includes the first setting value of the sheet feeding stage, to the printing apparatus.

2. The printing system according to claim 1, wherein the one or more first processors further execute the set of first instructions to
manage respective names of the plurality of sheet feeding stages so as to be associated with respective setting values of the plurality of sheet feeding stages, and
wherein a setting value of a sheet feeding stage managed in association with a name of the specified sheet feeding stage is obtained.

3. The printing system according to claim 1,
wherein the storage apparatus further comprises a sheet feeding cassette configured to include a plurality of sheet feeding stages, and
wherein a configuration of the plurality of sheet feeding stages included in the sheet feeding cassette of the printing apparatus is different from a configuration of the plurality of sheet feeding stages included in the sheet feeding cassette of the storage apparatus.

4. The printing system according to claim 3,
wherein a setting value of a first sheet feeding stage included in the sheet feeding cassette of the printing apparatus is different from a setting value of a first sheet feeding stage included in the sheet feeding cassette of the storage apparatus.

5. The printing system according to claim 1, wherein the one or more first processors further execute the set of first instructions to:
execute an authentication processing with respect to a user;
control an operation device to display a list including one or more print jobs stored in the storage apparatus and associated with the authenticated user; and
accept specifying of the print job included in the list from the user.

6. A printing apparatus comprising:
a sheet feeding cassette configured to include a plurality of sheet feeding stages;
one or more memories; and
one or more processors that execute a set of instructions to:
accept specifying of a sheet feeding stage, which is used when the printing apparatus executes a print job stored in a storage apparatus, from a user;
obtain a setting value of the specified sheet feeding stage;
transmit identification information, which indicates the print job, and the obtained setting value of the sheet feeding stage to the storage apparatus;
receive the print job, which includes the setting value of the sheet feeding stage, from the storage apparatus; and
execute the received print job according to the setting value of the sheet feeding stage,
wherein the storage apparatus further comprises a sheet feeding cassette configured to include a plurality of sheet feeding stages, and
wherein a configuration of the plurality of sheet feeding stages included in the sheet feeding cassette of the printing apparatus is different from a configuration of the plurality of sheet feeding stages included in the sheet feeding cassette of the storage apparatus.

7. A control method for a printing system configured to include a printing apparatus, which has a sheet feeding cassette including a plurality of sheet feeding stages, and a storage apparatus, the control method comprising:
receiving a print job, which includes a second setting value of a sheet feeding stage, from an external apparatus by the storage apparatus;
storing the received print job by the storage apparatus;
accepting specifying of a sheet feeding stage, which is used when the printing apparatus executes a print job stored in the storage apparatus, from a user by the printing apparatus;
obtaining a first setting value of the specified sheet feeding stage by the printing apparatus;
transmitting identification information, which indicates the print job, and the obtained first setting value of the sheet feeding stage to the storage apparatus by the printing apparatus;

receiving the identification information, which indicates the print job, and the first setting value of the sheet feeding stage from the printing apparatus by the storage apparatus;

changing a second setting value of a sheet feeding stage included in the print job indicated by the identification information to the received first setting value of the sheet feeding stage by the storage apparatus;

transmitting the print job, which includes the first setting value of the sheet feeding stage, to the printing apparatus by the storage apparatus;

receiving the print job, which includes the first setting value of the sheet feeding stage, from the storage apparatus by the printing apparatus; and executing the received print job according to the first setting value of the sheet feeding stage by the printing apparatus.

8. A control method for a printing apparatus configured to have a sheet feeding cassette including a plurality of sheet feeding stages, the control method comprising:

accepting specifying of a sheet feeding stage, which is used when the printing apparatus executes a print job stored in a storage apparatus, from a user;

obtaining a setting value of the specified sheet feeding stage;

transmitting identification information, which indicates the print job, and the obtained setting value of the sheet feeding stage to the storage apparatus;

receiving the print job, which includes the setting value of the sheet feeding stage, from the storage apparatus; and executing the received print job according to the setting value of the sheet feeding stage, wherein the storage apparatus further comprises a sheet feeding cassette configured to include a plurality of sheet feeding stages, and wherein a configuration of the plurality of sheet feeding stages included in the sheet feeding cassette of the printing apparatus is different from a configuration of the plurality of sheet feeding stages included in the sheet feeding cassette of the storage apparatus.

9. A non-transitory computer readable storage medium on which is stored a computer program for making a computer execute a control method for a printing apparatus configured to have a sheet feeding cassette including a plurality of sheet feeding stages, the control method comprising:

accepting specifying of a sheet feeding stage, which is used when the printing apparatus executes a print job stored in a storage apparatus, from a user;

obtaining a setting value of the specified sheet feeding stage;

transmitting identification information, which indicates the print job, and the obtained setting value of the sheet feeding stage to the storage apparatus;

receiving the print job, which includes the setting value of the sheet feeding stage, from the storage apparatus; and executing the received print job according to the setting value of the sheet feeding stage, wherein the storage apparatus further comprises a sheet feeding cassette configured to include a plurality of sheet feeding stages, and wherein a configuration of the plurality of sheet feeding stages included in the sheet feeding cassette of the printing apparatus is different from a configuration of the plurality of sheet feeding stages included in the sheet feeding cassette of the storage apparatus.

* * * * *